May 8, 1951     F. M. FIKE     2,552,005
ANTIRATTLING DEVICE FOR GEAR-SHIFTING CONTROL MECHANISMS
Filed May 20, 1949
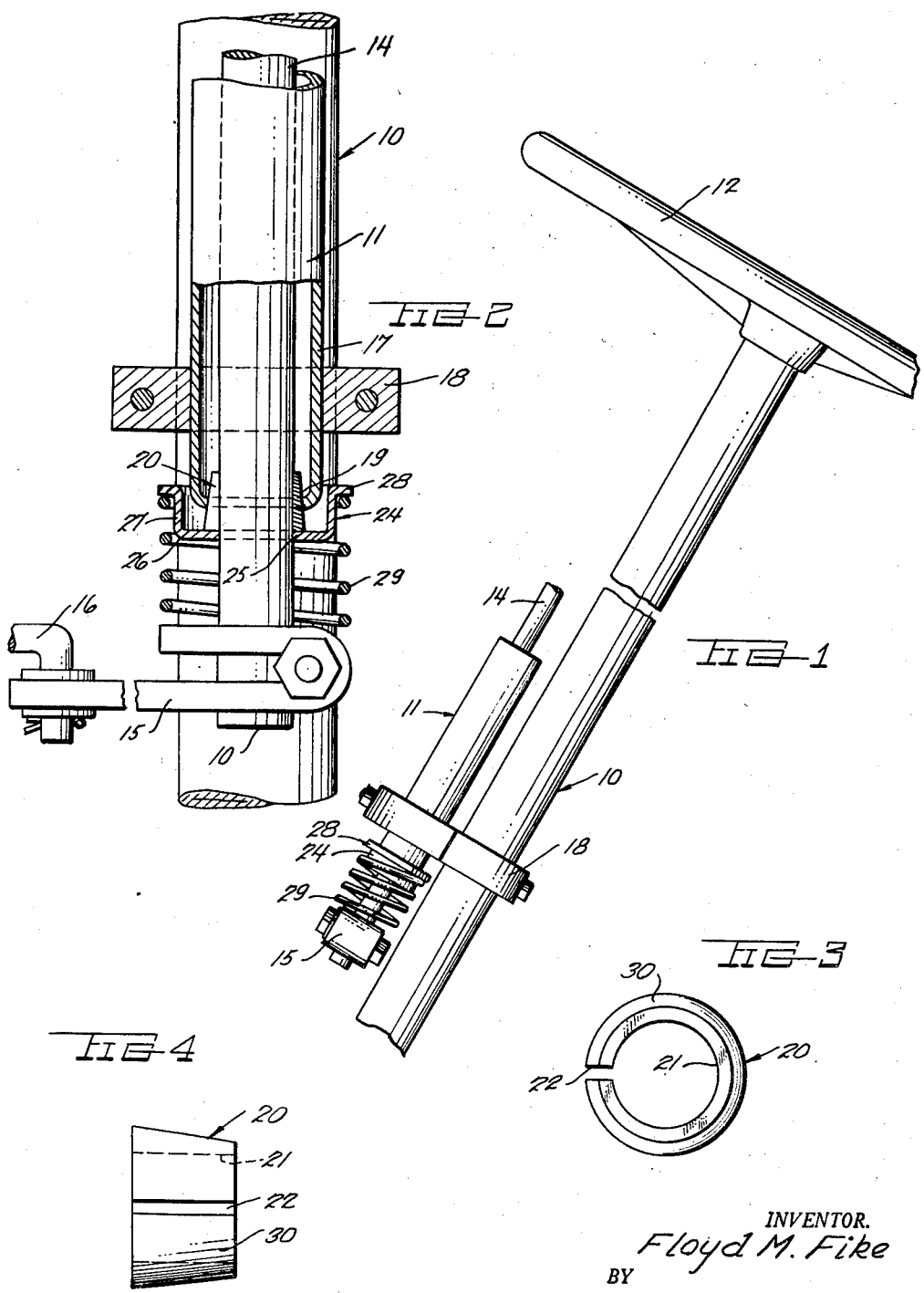
INVENTOR.
Floyd M. Fike Patented May 8, 1951

2,552,005

UNITED STATES PATENT OFFICE 2,552,005

ANTIRATTLING DEVICE FOR GEAR-SHIFTING CONTROL MECHANISMS

Floyd M. Fike, Perryton, Tex.

Application May 20, 1949, Serial No. 94,465

1 Claim. (Cl. 74—484)

This invention relates to gear-shifting mechanism, and more particularly to a remote-control, gear-shifting mechanism supported on the steering column of an automobile.

It is an object of this invention to provide a gear-shifting mechanism of the kind to be more particularly described hereinafter, having an improved bearing support for the rockable and slidable control rod formed for resisting the wear of the continual use and expansion as caused by soaking or absorbing oil or other lubricant.

Another object of this invention is to provide in a gear shift mechanism of this kind a novel bushing or bearing for the gear shift control rod at the lower end of the steering column formed for securely supporting and journaling the gear shift control rod in a manner to overcome the objectionable sticking or rattling of the control rod as journaled in the bushings currently employed at this point.

A further object of this invention is to provide a novel bushing for the control rod of a remote-control gear shift mechanism of this kind which may be readily installed as a replacement of the present types of bushings with little time, trouble and expense, to provide for the greatly improved operation of the gear shift mechanism.

Still another object of this invention is to provide a novel bushing or bearing of this kind which may be readily manufactured and formed with and from substantially conventional tubular or cylindrical formations of this general type.

With the above and other objects in view, my invention consists in the arrangement, combination and details of construction disclosed in the drawings and specification, and then more particularly pointed out in the appended claim.

In the drawings:

Figure 1 is a side elevation, partly broken away, of a gear shift mechanism mounted on the steering column of an automobile, the gear shift mechanism employing an embodiment of this invention;

Figure 2 is a vertical section, partly broken away, of the gear shift mechanism, having a bushing or bearing formed according to this invention;

Figure 3 is a top plan view of the bushing removed from the assembly;

Figure 4 is a side elevation of the bushing shown in Figure 3.

Referring to the drawings, the numeral 10 designates generally the steering column of an automobile having a gear-shifting mechanism 11 mounted adjacent the lower end thereof. The gear-shifting mechanism 11 is of the conventional type wherein the gear shift control lever is mounted on the upper end of the steering column 10 below the steering wheel 12.

The gear shift mechanism 11 includes a longitudinally-extending control rod 14 which is supported along the length of the steering column 10 for rotational and longitudinally-sliding movement. A lever arm 15 is fixed on the lower end of the control shaft or rod 14 and extends outwardly therefrom for pivotal connection with the gear shift rod 16, which is directly connected between the lever arm 15 and the gear-shifting forks of the transmission, not shown in the drawings.

A bearing sleeve 17, having an inside diameter greater than the outside diameter of the lower end of the gear shift control rod 14, is mounted adjacent the lower end of the steering column 10 by a clamp 18 which is clampingly engaged with the steering column 18 and with the bearing tube 17 adjacent the lower end thereof. The bearing sleeve 17 or tube is formed with an inturned flange 19 at the lower end thereof, the inner edge of the flange 19 being spaced slightly from the outside surface or diameter of the rod 14 which is rotatably and axially slidably mounted within the tube or housing 17.

Heretofore, in gear-shifting mechanisms of this type, a rubber or other resilient bearing or bushing has been disposed about the lower end of the rod 14 between the outer surface of the rod and the inside edge of the flange 19 to provide a bearing surface for the control rod in its sliding and rotating movement relative to the housing or tube 17. In the use of this rubber bushing, as this lower mechanism is subject to the chemical action of oil and other lubricants, the oil and lubricants effect the deterioration of the rubber bushing either resulting in the loosening of the bushing between the rod 14 and the housing 11 which results in a loose support for the rod and during the movement of the vehicle the rod 14 is caused to rattle in engagement with the tube 17. In other cases where the lubricant acts on the rubber or other fiber bushing at this point, the bushing is caused to swell and restrict the movement of the rod 14 resulting in the limited or very restricted and hard movement of the rod during the gear-shifting process. It is an object of this invention to provide a bushing or bearing 20 slidably and rotatably engageable about the lower end of the control rod 14 and engageable at the outer surface thereof with the inside edge of the inturned flange 19 for rotatably and slidably supporting the rod 14 in the lower end of the tube 17.

The bushing 20 formed according to an embodiment of my invention is formed of a short length of metal tubing having an inside cylindrical bore 21 engageable about the outer surface of the lower end of the rod 14. The bushing 20 is substantially frusto-conical in configuration, having the upper convergent end slidably engageable between the confronting edges of the inturned flange 19 and the lower wide end of the bushing disposed below the lower end of the tube 17. The tube 20 is formed with a longitudinally-extending slit 22 extending along the length thereof on one side to provide for the expansion or retraction of the bushing to suitably fit the opening formed between the inner edges of the flange 19 and the outside diameter of the rod 14. The slit 22 provides for the thermal expansion of the bushing 20 so that the bushing 20 will at all times securely bear against the outside surface of the lower end of the rod 14 and the inner surfaces of the confronting edges of the inturned flange 19.

The bushing 20 is slidably disposed on the lower end of the rod 14 and will be spring pressed into frictional engagement with the lower end of the tube or housing 17.

A cup-shaped washer 24 formed with a central opening 25 therein is rotatably and slidably engaged about the lower end of the rod 14 below the bushing 20 and above the connection of the lever arm 15. The washer 24 is formed with a lower annular wall 26 having an upturned marginal flange 27 about the periphery thereof. The inside diameter of the periphery 27 is of a greater length than the outside diameter of the housing or tube 17 and an outturned flange 28 is formed on the extreme upper end of the upwardly-extending flanges 27.

A coiled spring 29 is loosely engaged about the lower end of the rod 14 between the upper side of the outwardly-extending lever arm 15 and the lower side of the outturned flanges 28, the spring 29 also loosely engaging about the side walls 27 of the washer 24. As the lower side of the bushing 20 is in frictional engagement with the upper side of the bottom wall 26 of the cup-shaped washer 24, the tension of the spring 29 pressing the washer 24 upwardly about the lower end of the tube 17 will constantly press the bushing 20 upwardly into frictional engagement between the edge of the inturned flanges 19 and the outer surface of the lower end of the rod 14. As the outer surface of the bushing 20 is flared downwardly and outwardly from within the tube 17, any wear on the inside surface 21 or outside surface 30 will result in the upward sliding movement of the bushing 20 and as the bushing is formed with a longitudinal slit on one side thereof, this wear will be compensated for by the retraction of the bushing as it is pressed upwardly within the inside edges of the flanges 19. The tension of the spring 29 will press the bushing 20 in such a manner that the bushing will at all times be in frictional engagement with the lower end of the rod 14 for holding the rod against loose sliding or rocking movement relative to the housing 17 which loose movement results in the rattles of cars employing rubber or neoprene bushings at this point. The bushing 20, being made of suitable metal, will resist the chemical action of lubricants, thereby preserving the bearing or bushing 20 for long useful life and the metal formation of the bushing will resist the frictional wear encountered by a bearing at this point resulting from the long continued use and operation of the gear shift rod 14.

I do not mean to confine myself to the exact details of construction herein disclosed, but claim all variations falling within the purview of the appended claim.

I claim:

In a remote-control gear shift mechanism having a gear shift control rod mounted on the steering column of an automobile, a bearing tube concentrically disposed on a portion of said control rod and having its interior surface arranged in spaced relationship to said control rod, said bearing tube being fixedly secured to said steering column, said control rod having a lower end terminating in spaced relation below the lower end of the bearing tube, a gear shift lever arm fixed on said lower end of the control rod, an inwardly extending lateral annular flange formed on the lower end of the tube, the inner edge portion of said flange being arranged in spaced concentric relation with respect to said control rod, a conical bushing circumposed on said control rod for wedging frictional engagement with the flange on said bearing tube, resilient means supported by the lower portion of the control rod and concentrically disposed on the rod, a collar slidably circumposed on the rod against which the resilient means bears, said collar engaging said bushing for sliding the bushing upwardly on the control rod to thereby retain the bearing tube in fixed spaced relationship with the control rod.

FLOYD M. FIKE.

REFERENCES CITED

The following references are of record in the file of this patent:

UNITED STATES PATENTS

| Number | Name | Date |
| --- | --- | --- |
| 1,842,476 | Marles | Jan. 26, 1932 |
| 1,927,550 | Kishline | Sept. 19, 1933 |
| 2,193,230 | Ferguson | Mar. 12, 1940 |
| 2,210,535 | Hallanger | Aug. 6, 1940 |
| 2,236,732 | Oberhoffken | Apr. 1, 1941 |
| 2,275,779 | MacPherson | Mar. 10, 1942 |
| 2,312,975 | Peterson et al. | Mar. 2, 1943 |
| 2,424,020 | Chatelain | July 15, 1947 |